Figure 1:
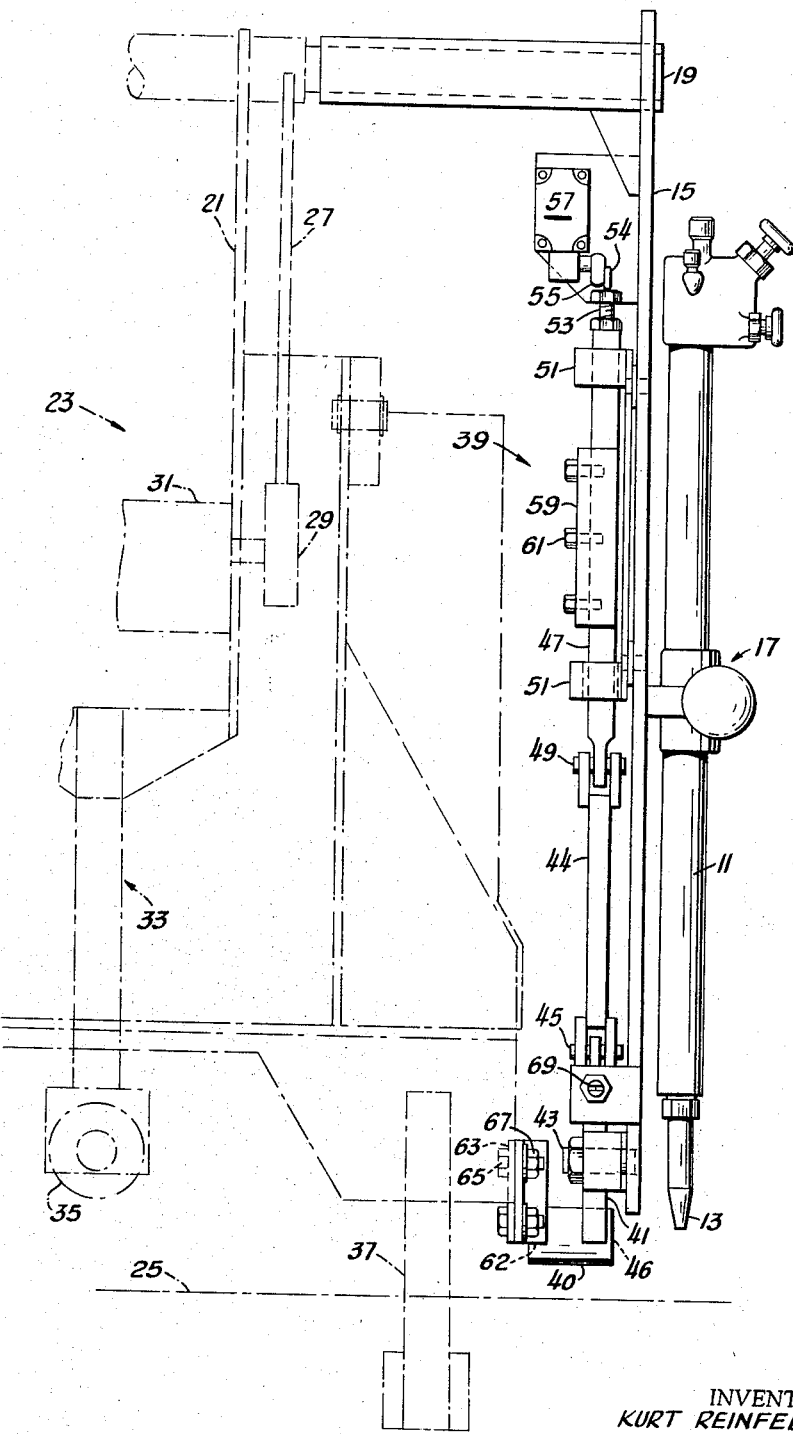

INVENTORS
KURT REINFELD &
JOSEPH ROKOP
BY David M. Bunnell
their Agent

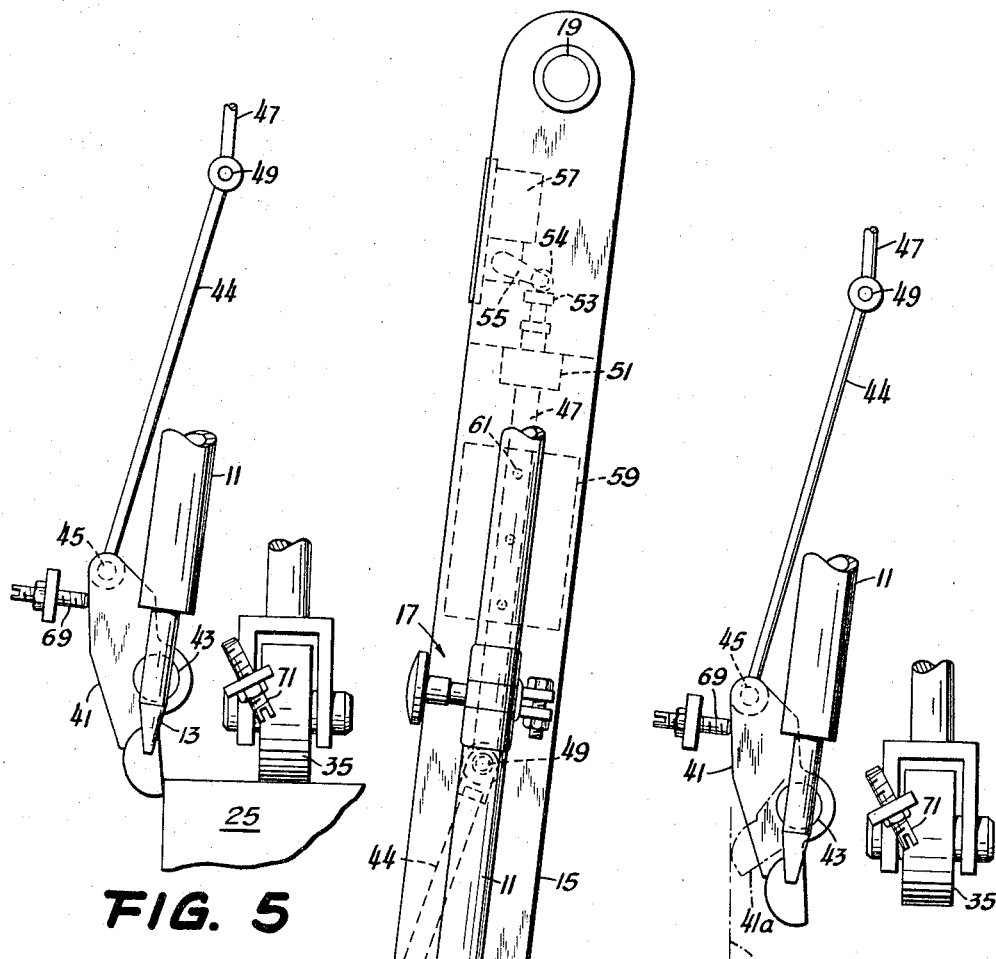
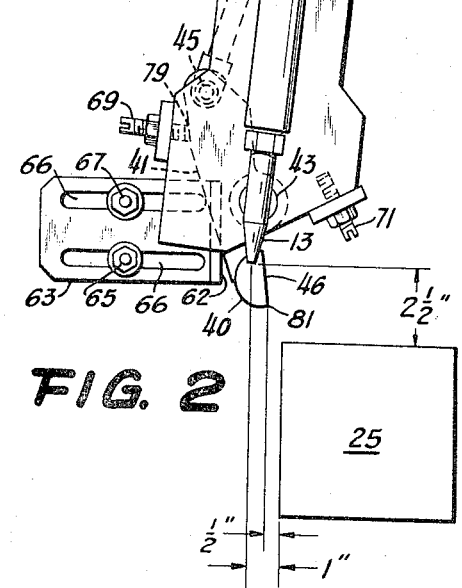
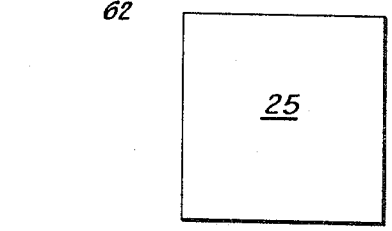

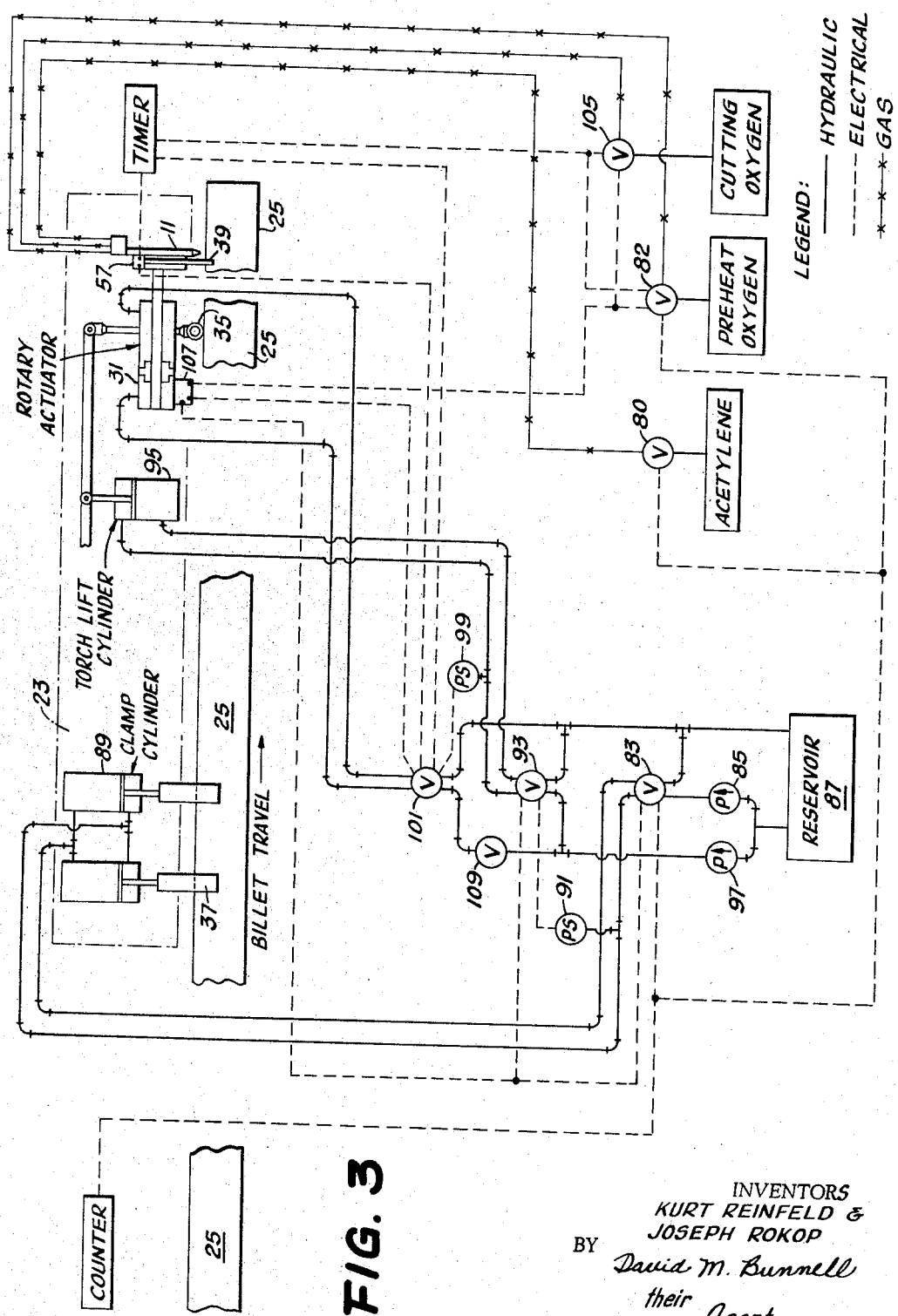

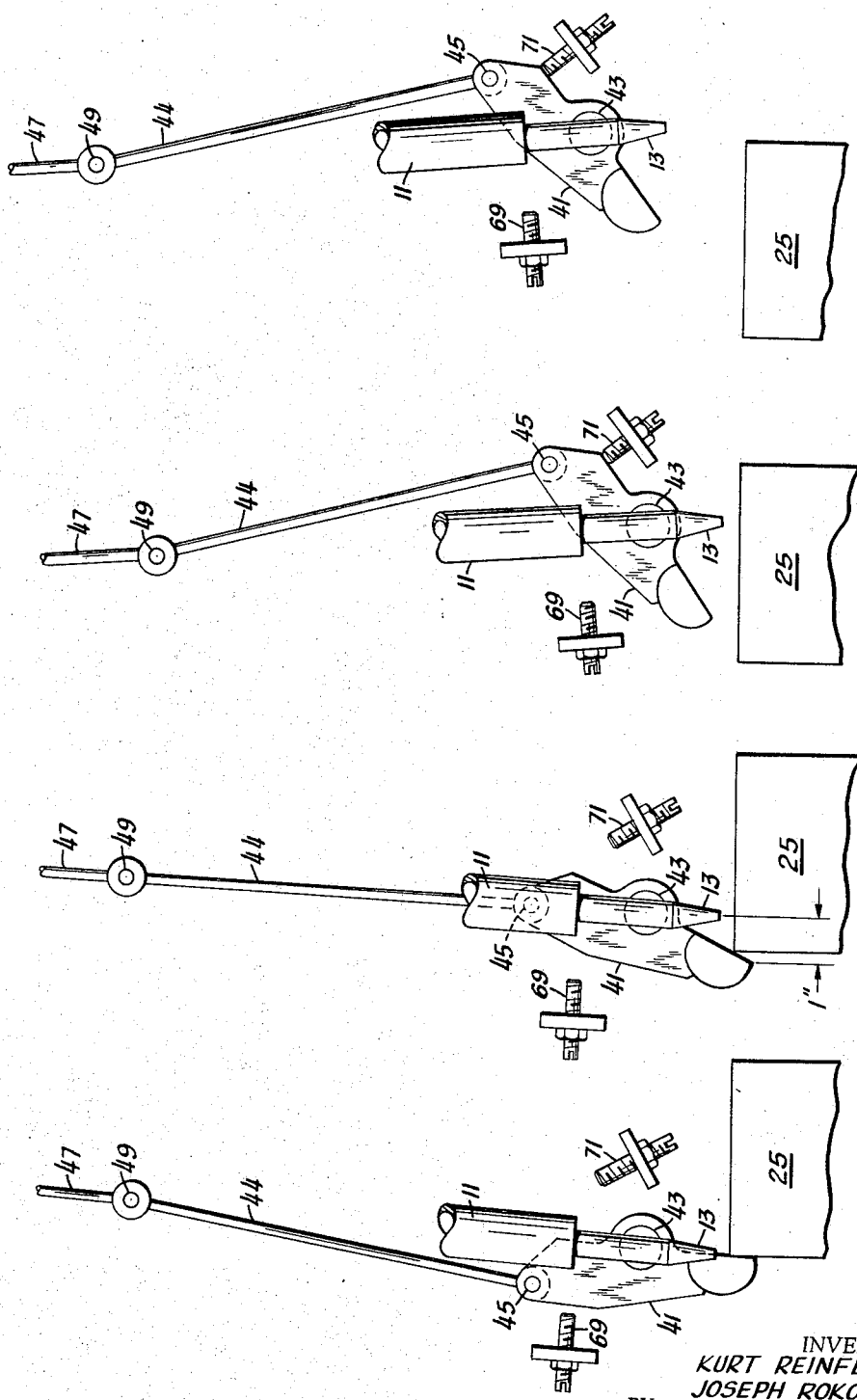

United States Patent Office — 3,339,903 — Patented Sept. 5, 1967

3,339,903
AUTOMATIC TORCH POSITIONING APPARATUS
Kurt Reinfeld and Joseph Rokop, Pittsburgh, Pa., assignors to Koppers Company, Inc., a corporation of Delaware
Filed May 28, 1964, Ser. No. 370,846
6 Claims. (Cl. 266—23)

This invention relates generally to the cutting of metal castings and, more particularly, to a feeler device for automatically positioning the cutting torch used to cut the metal casting produced in a continuous casting machine into preselected cast lengths.

Continuous casting apparatus for steel cast the steel in the form of an elongated strand of metal. To produce selected lengths of steel castings, billets or slabs, it is necessary to periodically cut the strand. It is customary to use an automatically operated torch mechanism which travels with the casting while the cut is being made. The torch swings normal to the path of travel of the casting to produce a cut transverse of the line of travel of the casting. The position of the tip of the torch is preset so that it will always point to the edge of the casting prior to starting the cut. A problem arises however in that the edge of the casting is not always in the same relative position to the torch as it passes through the cutting apparatus.

As would be expected, difficulties have been encountered with the foregoing system because the actual position of the edge of the casting with respect to the torch tip varies with every cutting cycle due to tolerances in component parts and possible misalignments of the casting. When this variation exceeds a certain value, the torch will begin its cut inside of the edge of the casting thus leaving an uncut portion at the edge which must be cut thereafter by hand.

This invention overcomes this difficulty by means of a device attached to the torch which automatically locates the tip of the torch with respect to the edge of the casting in such a way that the tip of the torch will point exactly at the edge of the casting at the beginning of each cutting cycle.

In accordance with this invention, an apparatus is provided which correctly positions the cutting torch of the continuous casting machine automatic cut-off mechanism with respect to the edge of the metal casting. A feeler, adapted to contact the casting, is pivotally attached to the cutting torch support arm such that the feeler can be rotated in a direction normal to the path of travel of the metal casting so that it extends below the tip of the cutting torch. Means are provided for rotationally positioning the feeler relative to the tip of the torch such that at the start of each cutting cycle the portion of the feeler which is adapted to contact the edge of the casting extends below and lies between the torch tip and the casting. Means are also provided for rotating the support arm about a pivot located at its upper end such that the feeler and the torch tip simultaneously move toward the casting causing the feeler to contact the casting and rotate about its pivot. A control means controls the operation and movement of the torch during the cutting sequence and is attached to the feeler such that when the tip of the torch has moved to a position where the centerline of the tip if directed at the upper edge of the casting the feeler has rotated to a position where it causes the control means to be actuated.

The above and further objects and novel features of the invention will appear more fully from the detailed description when the same is read in conjunction with the accompanying drawings. It is to be expressly understood, however, that the drawings are not intended to be a definition of the invention but are for the purpose of illustration only.

FIGURE 1 is an elevational view of an embodiment of the invention,
FIGURE 2 is an end view of the embodiment of the invention illustrated in FIGURE 1,
FIGURE 3 is a schematic diagram of the control system associated with the invention,
FIGURES 4, 5, 6, 7, 8 and 9 are partial elevational views illustrating six successive positions of the novel feeler device and cutting torch during the operation of severing a continuous casting strand.

In the continuous casting of steel, it is necessary to have a mechanism which will cut the constantly moving casting into preselected lengths of suitable size for further processing. For this purpose, there is conventionally employed a cutting torch mounted on a carriage that is arranged to move forward and backward along the line of travel of the casting. When the casting has advanced to a point where it is desired to make a cut, an electronic counter gives a signal to a control system causing the carriage to be clamped to the casting so that the torch travels forward at the same speed as the casting. The torch, which has been preset so as to start cutting at one edge of the casting, is pivotally mounted on the carriage and is swung in an arc normal to the path of travel of the casting so that it makes a straight cut in the casting while the carriage is clamped to and traveling with the casting. When the cut is completed, the carriage unclamps from the casting and returns to its starting position while the torch is swung back into starting position for the next cutting cycle.

Referring now to FIGURE 1, there is illustrated a cutting torch 11 and the carriage 23 therefor. Torch 11 is adjustably mounted to torch arm 15 by clamp assembly 17. Torch 11 is advantageously of the oxyacetylene type but any conventional type of gas flame cutting torch or one utilizing a Laser device can be used if desired. The upper end of torch arm 15 is rotatably mounted by pivot 19 to torch lift 21 which is mounted within torch carriage 23. Lift 21 permits torch pivot 19 to be raised and lowered to properly regulate the height of torch tip 13 above the billet 25.

Gear segment 27 attached to torch pivot 19 meshes with gear segment 29 connected to torch actuator 31 which operates through the gear segments 27 and 29 to turn torch pivot 19 and cause torch 11 to swing through its cutting arc. Wheel assembly 33 attached to torch lift 21 is arranged such that wheel 35 contacts billet 25 and maintains torch tip 13 the correct distance above the top of billet 25 when torch lift 21 is lowered so as to bring torch 11 into cutting position.

Hydraulically actuated clamps 37 are attached to torch carriage 23. When an electronic counter determines that a desired length of billet 25 has traveled past, clamps 37 are actuated by a conventional hydraulic ram (not shown) to grasp the billet. Thereafter, torch carriage 23 is caused to travel with billet 25 during the cutting cycle. Torch carriage 23 is conventionally arranged to travel on and be supported by a pair of overhead tracks (not shown). Suitable means (not shown) such as a powered winch is also provided to return carriage 23 to its starting position after each cut has been completed.

The torch 11 is normally arranged so that each time after the cutting cycle has been completed, torch actuator 31 returns the torch to the same starting position. Thus, as the torch lift 21 is again lowered to bring the torch into cutting position for another cycle of operation, the torch will be located in exactly the same position with respect to the normal path of travel of the billet as it was for the previous cycle. The disadvantage has been that the actual position of the edge of the billet with respect to the torch tip varies in every cutting cycle due to tolerances in component parts and possible misalignment of the billet. When this variation exceeds a certain value heretofore, the torch left an uncut portion at the edge and this portion had to be cut by hand.

This invention avoids the foregoing difficulty by providing a positioning arrangement denoted generally as 39, which automatically positions the torch tip in correct relationship to the actual position of the billet edge on each successive cutting cycle. This arrangement 39 assures that complete cutting of the billet will occur.

Positioning arrangement 39 includes a feeler 41 adapted to contact the edge of billet 25. The billet 25 has a square cross section but can also have a rectangular cross section in which case it is termed a slab. The feeler 41 is a finger shaped bar having a straight edge 46 at its lower end for contacting an upper edge of billet 25. Feeler 41 is pivotally attached by pin 43 at a point intermediate to its ends to the arm 15 which carries torch 11 and feeler 41 is so shaped that its point of attachment to arm 15 can be located in the same plane as the centerline of torch 11. The rotational motion of feeler 41 around pin 43 is transferred to linear motion by pivotally attaching a link 44 to the upper end of feeler 41 by means of pin 45. Feeler 41 has an arcuate appendage 40 on the side opposite edge 46 which extends at right angles to the bar portion of feeler 41 and serves to contact edge 62 of reset stop 63 to return feeler 41 to its starting position between cycles as hereinafter described.

Link 44 is pivotally attached to push rod 47 by pin 49 so that when feeler 41 is rotated about pivot pin 43 push rod 47 reciprocates in guides 51 which are attached to torch arm 15.

Preheat position adjustment screw 53 is located in the top of push rod 47 so that it contacts wheel 54 attached to lever arm 55 of limit switch 57. Adjustment screw 53 can be adjusted to control the amount of travel of push rod 47 needed to activate limit switch 57 which controls the cutting cycle as hereinafter described.

Counterweight 59 is attached to push rod 47 between guides 51 by bolts 61. Adjustable reset stop 63 is attached to torch carriage 23 by bolts 65, passing through slots 66 (FIGURE 2) in stop 63, and nuts 67. The limit of rotation of feeler 41 around pivot pin 43 is controlled by starting position adjustment screw 69 and feeler retainer screw 71 (FIGURE 2). Feeler 41 is urged against either adjustment screw 69 or retainer screw 71 by the weight of counterweight 59 acting through link 44.

Turning now to FIGURE 2, the novel apparatus of FIGURE 1 is shown. Torch 11, attached to torch arm 15, is shown prior to being lowered into a position to cut billet 25. The tip of torch 11 as illustrated herein is located approximately two and one-half inches above the top of the billet and about one inch from the path of travel of the billet. The position of feeler 41 is adjusted by threading the starting position adjustment screw 69 into or out from arm 15 so that end 79 bears against an edge of feeler 41 and pivots the feeler about pin 43 so that the lower tip 81 of the feeler is located approximately one-half inch from the path of travel of the billet and extends approximately one and one-fourth inches below tip 13. Reset stop 63 is adjusted by loosening nuts 67 and sliding it horizontally on bolts 65 to a new position so that feeler 41 will contact reset stop 63 and be returned to its starting position against adjustment screw 69 when the arc of travel of torch arm 15 is varied to cut billets of different thicknesses.

The torch cut-off mechanism is operated by the hydraulic and electrical system illustrated in schematic fashion by FIGURE 3. When a selected length of billet has passed the electronic counter an electrical signal is given to solenoid valves 80 and 82 to open the acetylene and preheat oxygen supply lines to the torch 11. Simultaneously a signal is given to four way solenoid valve 83 which controls the operation of clamps 37 causing pump 85 to deliver hydraulic fluid from reservoir 87 to the rod end of clamping cylinders 89 so that the clamps grasp the billet 25.

When the clamping is completed the build-up of hydraulic pressure causes pressure switch 91 to energize four way solenoid valve 93 which controls the flow of hydraulic fluid to the torch lift cylinder 95. This causes pump 97 to deliver hydraulic fluid from reservoir 87 to the rod end of torch lift cylinder 95 and the torch is thereby lowered into cutting position so that wheel 35 contacts the top of billet 25.

When the lowering is completed pressure switch 99 which is sensitive to the build-up of hydraulic pressure in the torch lift hydraulic system energizes four way solenoid valve 101 so that the flow of pump 97 is directed to the rotary actuator 31 causing the torch to move toward the edge of the billet. When the tip of the torch reaches the edge of the billet the automatic edge feeler device 39 trips limit switch 57 which deenergizes solenoid 101 causing the torch to stop its rotation. Simultaneously a signal is given to the electric timer and the torch flame is adjusted to preheat the billet. Any further activation or deactivation of limit switch 57 caused by the mechanism of the feeler device will not have any further effect upon the electrical control system within the same cycle.

After the preheat time has elapsed, the timer energizes valve 105 causing the cutting oxygen to be turned on so that the torch flame will cut the billet transversely of its direction of travel. Simultaneously valve 101 is energized so that the flow of pump 97 is again directed to rotary actuator 31 so that torch 11 swings through its cutting stroke. When the torch finishes the cutting stroke, limit switch 107 is tripped which closes valves 82 and 105, cutting off the oxygen supply to the torch, deenergizes valves 83 and 93 and energizes valve 101. This causes the unclamping of the torch carriage from the billet and the lifting of the torch. After the lifting of the torch is completed, the build-up of hydraulic pressure causes the flow of hydraulic fluid to pass sequence valve 109 so that the torch is retracted. When the retraction is completed, valve 101 is deenergized and centered so that the system is ready to receive the new signal of the counter to start the next cycle.

The novel positioning device operates to stop the movement of torch arm 15 when the torch is in the correct position with respect to the billet edge in the following manner. After rotary torch actuator 31 has been initially activated as described above, torch arm 15 moves toward the billet. Edge 46 of feeler 41 sequentially contacts the side and the edge of the billet causing feeler 41 to rotate about pivot pin 43 which is located on the centerline of the torch. Torch 11 continues to move toward the edge of the billet. The rotation of feeler 41 causes link 44 to move push rod 47 upward so that preheat position adjustment screw 53 moves lever arm 55 of limit switch 57. Preheat position adjustment screw 53 controls the effective length of push rod 47 and it is adjusted so that when the centerline of torch tip 13, the edge 46 of feeler 41 in contact with the billet 25 and the edge of the billet 25 are located in the same plane so that the centerline of torch tip 13 points exactly at the edge of the billet, the linear motion imparted to push rod 47 by the rotation of feeler 41 is sufficient to activate limit switch 57 which stops the movement of torch arm 15 and activates the timer as heretofore described.

In order to avoid having the feeler device in contact with the hot billet throughout the cutting cycle, link 44, push rod 47, and pins 45 and 49 are arranged so that after the torch has traveled approximately one inch on its cutting arc, feeler 41 will no longer contact billet 25. This is accomplished by locating the pivot points at 45 and 49 so that the centerline of link 44 and push rod 47 form a straight line when the torch has traveled approximately one inch on its cutting arc. As it passes this point the pivot at 45 continues to move to the right so that the weight of counterweight 59 acting through push rod 47 and link 44, which heretofore was acting to rotate edge 46 of feeler 41 toward the billet edge, now causes feeler 41 to rotate in the opposite direction out of contact with billet 25 and be urged against feeler retainer screw 71.

When the cut has been completed it is necessary to rotate the feeler 41 back to its starting position so that it again bears against end 79 of starting position adjustment screw 69 in preparation for the next cutting cycle. As torch arm 15 swings back to the starting position, appendage 40 of feeler 41 contacts edge 62 of reset stop 63. This causes feeler 41 to rotate about pivot pin 43 to the point beyond where the centerline of link 44 and push rod 47 lie on the same straight line so that counterweight 59 acting through push rod 47 and link 44 causes feeler 41 to continue to rotate in the same direction until it contacts end 79 of starting position adjustment screw 69.

FIGURES 4 through 9 illustrate in more detail the various relative positions between billet 25, torch 11 and feeler 41 during the cutting cycle.

FIGURE 4 illustrates the torch assembly in starting position prior to clamping (feeler 41a shown in dotted lines having been reset to its starting position by contact with edge 62 of reset stop 63 so that it is being urged as shown in solid lines against starting position adjustment screw 69).

In FIGURE 5, the torch carriage (not shown) has been clamped to and is traveling with billet 25 and torch 11 has been lowered into cutting position so that torch lift wheel 35 rides on the top of billet 25. The rotary torch actuator (not shown) begins to move torch 11 and feeler 41 toward billet 25 and feeler 41 has contacted the edge of billet 25 while tip 13 of torch 11 is still approximately one-half inch from the path of travel of the billet. As the torch continues to move toward the line of travel of the edge of the billet, feeler device 41 rotates about pivot pin 43 located on the centerline of torch 11 causing link 44 to move push rod 47 upward.

When the feeler 41 and torch 11 have reached the position shown in FIGURE 6, such that the centerline of tip 13 of torch 11 is pointed exactly at the edge of billet 25, push rod 47 actuates the limit switch 57 (FIGURE 1) stopping the travel of torch 11 and adjusting the flame of torch 11 to preheat the billet. When the preheating cycle is completed the gas supply to the torch is adjusted to furnish the necessary cutting flame and torch 11 begins to move through the cutting arc. After the torch has moved one inch from the edge of the billet on its cutting arc as shown in FIGURE 7, the arrangement of link 44 and push rod 47 is such that the weight of counterweight 59 (FIGURE 1) on push rod 47 causes feeler 41 to be tripped out up out of contact with billet 25 and urged against feeler retainer screw 71 throughout the remainder of the cutting cycle as shown in FIGURE 8.

FIGURE 9 illustrates the torch assembly after it has completed the cut and has been lifted up out of cutting position simultaneously with the unclamping of the torch carriage from the billet. The torch is then returned to the starting position shown in FIGURE 1 with adjustable stop 63 set so as to contact feeler 41 and cause it to rotate so that it again contacts adjustment screw 69. The cycle is repeated when the electronic counter again actuates the control system.

It can be seen that limit switch 57 is actuated when feeler 41 reaches a certain rotational position and at this point the edge 46 of feeler 41 and the centerline of torch 11 will be in a certain relative position to each other. Therefore, as the amount of rotation imparted to feeler 41 depends only upon the actual position of the edge of the billet, once adjustment screw 53 is set so that limit switch 57 is actuated when the centerline of torch 11 points at the edge of the billet the torch arm 15 will always stop when the torch tip 13 points at the edge of the billet regardless of where the edge of the billet is located.

The foregoing has described a novel apparatus which assures the correct positioning of the cutting torch of a continuous casting machine cut-off apparatus so that incomplete cuts of the casting are avoided. This eliminates the need for completing the cutting by hand which may require slowing down or stopping the casting operation. The apparatus combines simplicity of construction and control with versatility as it can be used to correctly position the cutting torch with respect to the edge of the casting regardless of the actual position of the casting or the size of the casting being cut.

We claim:

1. A continuous casting machine cut-off mechanism in which the cutting means is automatically positioned in correct relationship to the edge of the metal casting at the start of each cutting cycle comprising:
   (a) counting means responsive to a length of said casting;
   (b) a carriage mounted to reciprocate along the line of travel of said casting;
   (c) clamps mounted on said carriage and responsive to said counting means for grasping said casting whereby said carriage travels with said casting;
   (d) a cutting torch;
   (e) a feeler adapted to contact said casting;
   (f) a pivot for supporting said feeler intermediate the ends of said feeler for rotation;
   (g) a support arm for said torch and said pivot;
       (1) means for rotationally positioning said feeler about said pivot so that the portion of said feeler which is adapted to contact said casting extends below said cutting torch and lies between said cutting torch and said casting;
   (h) a torch lift attaching said support arm to said carriage;
       (1) said torch lift having a wheel assembly adapted to contact the top of said casting to stop the lowering of said lift when said torch is at the proper height above said casting to cut said casting;
   (i) a rotary torch actuator for moving said support arm carrying said torch and said pivot for said feeler relative to said lift toward said casting after said torch lift has lowered said torch into cutting position such that said feeler sequentially engages a side and then an edge of said casting and rotates about said pivot until a predetermined rotation is reached;
   (j) a first limit switch adapted to be actuated by said feeler when said predetermined rotation about said pivot is reached such that said first limit switch causes said rotary torch actuator to stop the movement of said support arm toward said casting when said torch is pointed at the edge of said casting, and turns on said torch to preheat the edge of said billet;
   (k) a timer mechanism to be actuated by said first limit switch for adjusting said torch after a predetermined time to cut said casting and simultaneously causing said rotary torch actuator to move said support arm transverse of the direction of casting travel such that said torch cuts said casting;
       (1) a second limit switch adapted to be actuated by the movement of said support arm transverse to the direction of travel of the casting when said torch has completed the cutting of said casting which turns off said torch, causes said clamps to detach said carriage from said casting, causes said torch lift to raise said support arm, and causes said rotary torch actuator to retract said torch arm; and
   (l) means for returning said carriage to its starting position on the line of travel of said casting adapted to be actuated by said second limit switch such that said apparatus is ready for the next signal from said counting means to begin another cutting cycle.

2. A continuous casting machine cut-off mechanism in which the cutting means is automatically positioned in correct relationship to the edge of the metal casting at the start of each cutting cycle comprising:
  (a) counting means responsive to a length of said casting;
  (b) a carriage mounted to reciprocate along the line of travel of said casting;
  (c) clamps mounted on said carriage and responsive to said counting means for grasping said casting so that said carriage travels with said casting;
  (d) a cutting torch;
  (e) a feeler which is adapted to contact said casting;
  (f) a pivot intermediate the ends of said feeler for supporting said feeler for rotation;
  (g) a support arm attached to said carriage adapted to carry said torch and said pivot;
    (1) means for rotationally positioning said feeler about said pivot so that the portion of said feeler which is adapted to contact said casting extends below said cutting torch and lies between said cutting torch and said casting;
  (h) a torch lift attaching said support arm to said carriage adapted to lower said support arm carrying said torch and said pivot for said feeler after said carriage has been clamped to and is traveling with said casting;
    (1) said torch lift having a wheel assembly adapted to contact the top of said casting to stop the lowering of said lift when said torch is at the proper height above said casting to cut said casting;
  (i) a rotary torch actuator for moving said support arm carrying said torch and said pivot for said feeler relative to said lift toward said casting after said torch lift has lowered said torch into cutting position such that said feeler sequentially engages a side and then an edge of said casting and rotates about said pivot until a predetermined rotation is reached;
  (j) a first limit switch adapted to be actuated by said feeler when said predetermined rotation about said pivot is reached such that said limit switch causes said rotary torch actuator to stop the movement of said support arm toward said casting when said torch is pointed at the edge of said casting and turns on said torch to preheat the edge of said billet;
  (k) a timer mechanism to be actuated by said first limit switch which after a predetermined time adjusts said torch to cut said casting and simultaneously causes said rotary torch actuator to move said support arm transverse of the direction of casting travel such that said torch cuts said casting;
  (l) means attached to said feeler to cause said feeler to rotate about said pivot after said torch has begun to cut said casting such that said feeler is caused to reach a rotational position whereby said feeler no longer contacts said casting;
  (m) a second limit switch adapted to be actuated by the movement of said support arm transverse to the direction of casting travel when said torch has completed the cutting of said casting which turns off said torch, causes said clamps to detach said carriage from said casting, causes said torch lift to raise said support arm, causes said rotary torch actuator to retract said torch arm; and
  (n) means for returning said carriage to its starting position on the line of travel of said casting adapted to be actuated by said second limit switch such that said apparatus is ready for the next signal from said counting means to begin another cutting cycle.

3. A continuous casting machine cut-off mechanism in which the cutting means is automatically positioned in correct relationship to the edge of the metal casting at the start of each cutting cycle comprising:
  (a) counting means responsive to a length of said casting;
  (b) a carriage mounted to reciprocate along the line of travel of said casting;
  (c) grasping means mounted on said carriage and responsive to said counting means for attaching said carriage to said casting on signal from said counting means such that said carriage travels with said casting;
  (d) a cutting torch;
  (e) a feeler which is adapted to contact said casting;
  (f) a pivot intermediate the ends of said feeler for supporting said feeler for rotation;
  (g) a support attached to said carriage adapted to carry said torch and said pivot for said feeler;
    (1) means for rotationally positioning said feeler about said pivot so that the portion of said feeler which is adapted to contact said casting extends below said cutting torch and lies between said cutting torch and said casting;
  (h) lift means attached to said carriage adapted to lower said support arm carrying said torch and said pivot for said feeler after said carriage has been clamped to and is traveling with said casting such that said torch is at the proper height above said casting to cut said casting;
  (i) torch moving means for moving said support arm carrying said torch and said pivot for said feeler relative to said lift means toward said casting after said lift means has lowered said torch into cutting position such that said feeler sequentially engages a side and then an edge of said casting and rotates about said pivot until a predetermined rotation is reached;
  (j) a first control means adapted to be actuated by said feeler when said predetermined rotation about said pivot is reached such that said first control means stops the movement of said support arm toward said casting when the centerline of said torch points to the edge of said casting and turns on said torch to preheat the edge of said billet;
  (k) a timer mechanism to be actuated by said first control means which after a predetermined time adjusts said torch to cut said casting and simultaneously starts said support arm moving transverse of the billet travel such that said torch cuts said casting;
  (l) a second control means adapted to be actuated by the movement of said support arm transverse to the direction of travel of the casting when said torch has completed the cutting of said casting which turns of said torch, said grasping means to detach said carriage from said casting, causes said lift means to raise said support arm and causes said torch moving means to retract said torch arm; and
  (m) means for returning said carriage to its starting position on the line of travel of said casting adapted to be actuated by said second control means such that said apparatus is ready for the next signal from said counting means to begin another cutting cycle.

4. A control system for the cut-off mechanism of a continuous casting machine which assures the correct positioning of the cutting torch with respect to the metal casting comprising, an electronic counter responsive to the length of a casting, a first solenoid valve responsive to said electronic counter to apply pressure fluid to a clamp a first pressure switch responsive to a predetermined pressure showing the clamp set on the slab for activating a second solenoid valve which actuates a torch moving ram, a second pressure switch responsive to a predetermined pressure to show said torch is in cutting postiion for activating a third solenoid valve which actuates a torch rotating ram for moving said torch transverse of said casting, a limit switch responsive to feeler means indicating said torch is in a predetermined position with respect to said casting for deactivating said third solenoid valve and actuating timer mechanism which controls the movement and operation of said torch during the cutting of the casting, said timer mechanism causing said third solenoid valve to be reactivated after the edge of the casting has been preheated such that said torch again moves transverse of said casting and cuts said casting and a limit switch responsive to a predetermined transverse movement of said torch to cause said control system to return said clamp, said torch and said feeler to their initial positions.

5. Cyclically operative aparatus for flame cutting a continuous elongate member into discrete lengths comprising:
(a) a carriage supporting a portion of said apparatus that is adapted to reciprocate along the line of travel of said elongate member;
(b) clamp means mounted to said carriage and adapted to engage said elongate member and move said carriage from an initial position at the same speed of advancement as said member;
(c) a first arm mounted to said carriage and pivotal in a vertical plane transversely of the direction of travel of said elongate member;
(d) a flame cutting torch adjustably and pivotally mounted to said first arm;
(e) a second arm carrying a feeler adapted to engage said elongate member and pivotally mounted to said first arm at a point intermediate the ends of said second arm;
(f) means for rotating said second arm whereby said feeler contacts said elongate member;
(g) means mounted to said carriage that is adapted to contact said elongate member and determine the relative vertical postiion of said flame cutting torch with respect to said member;
(h) means for moving said first arm and the torch and feeler carried thereon in said transverse vertical plane whereby said feeler engages said elongate member and rotates in a transverse vertical plane through a preselected angle;
(i) means actuated when said second arm rotates through said preselected angle to temporarily halt the rotary movement of said first arm when said torch is directed at a first zone of contact on the surface of said elongate member;
(j) means to ignite said torch whereby the flame preheats said zone of contact on said elongate member while said torch is temporarily halted;
(k) means to reactivate the pivotal movement of said first arm in said transverse vertical plane and simultaneously cause a flow of cutting oxygen to said torch whereby as said torch traverses said elongate member the same is flame-cut;
(l) means actuated by said first arm whereby when said torch has completed the cutting of said elongate member both the flame and cutting oxygen of said torch are extinguished and said clamps disengage from said elongate member, said first arm being returned in said vertical plane to the initial position from whence it started; and
(m) means for returning said carriage along the line of travel of said elongate member but in an opposite direction to movement thereof to its initial starting position.

6. Cyclically operative apparatus for flame cutting a continuous elongate member into discrete lengths comprising:
(a) a carriage supporting a portion of said apparatus that is adapted to reciprocate along the line of travel of said elongate member;
(b) clamp means mounted to said carriage and adapted to engage said elongate member and move said carriage from an initial position at the same speed of advancement as said member;
(c) a first arm mounted to said carriage and pivotal in a vertical plane disposed transversely of the direction of travel of said elongate member;
(d) a flame-cutting torch adjustably and pivotally mounted to said first arm;
(e) a second arm carrying a feeler adapted to engage said elongate member and pivotally mounted to said first arm at a point intermediate the ends of said second arm;
(f) means for rotating said second arm so that said feeler contacts said elongate member in a zone below said cutting torch;
(g) means attaching said first arm to said carriage and adapted to lower said first arm carrying said torch and said second arm carrying said feeler after said carriage has been clamped to and is traveling at the same speed along with said elongate member;
 (1) said arm attaching means having a wheel assembly adapted to contact said elongate member and halt the lowering of said arm with respect to said member whereby said cutting torch is then at a proper height above said member for the flame cutting thereof;
(h) means for thereafter moving said first arm and the torch and feeler carried thereby in said transverse plane whereby said feeler engages the elongate member and rotates in a transverse plane through a preselected angle;
(i) a first limit switch adapted to be actuated by said second arm when it has rotated through said preselected angle whereby when said first limit switch is actuated, the rotation of said first arm halts and said torch is in such a position that it is directed toward a zone on the surface of said elongate member at which flame-cutting commences;
(j) means to ignite gases flowing through said torch forming a flame that burns at the end of said torch and said flame preheats said zone on the surface of said elongate member;
(k) means adapted to flow a separate gas through said torch after said period of time which separate gas removes heated metal and forms a cut through said elongate member;
(l) means to reactivate the pivotal movement of said first arm and rotate said torch transversely of said elongate member to sever the same by flame cutting;
(m) a second limit switch adapted to be actuated by the movement of said first arm when said torch has completed the flame-cutting of said elongate member whereby the gases flowing through said torch cease and said clamps disengage from said elongate member;
(n) means to pivot said first arm transversely back across said elongate member to an initial starting position; and
(o) means to return said carriage to its initial starting position.

References Cited

UNITED STATES PATENTS

| | | | |
|---|---|---|---|
| 2,685,443 | 8/1954 | Rath | 266—23 |
| 2,806,263 | 9/1957 | Hogan | 22—57.2 |
| 3,227,432 | 1/1966 | McDermott | 263—23 |

JOHN F. CAMPBELL, *Primary Examiner.*

R. F. DROPKIN, *Assistant Examiner.*